United States Patent
Jiang et al.

(10) Patent No.: US 9,207,379 B2
(45) Date of Patent: Dec. 8, 2015

(54) LIGHT GUIDE PLATE, BACKLIGHT MODULE AND DISPLAY DEVICE BOTH WITH THE LIGHT GUIDE PLATE

(71) Applicant: BOE TECHNOLOGY GROUP CO., LTD., Beijing (CN)

(72) Inventors: Wenjie Jiang, Beijing (CN); Xingxing Zhao, Beijing (CN); Kailiang Zhang, Beijing (CN); Zezhou Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 61 days.

(21) Appl. No.: 14/103,784

(22) Filed: Dec. 11, 2013

(65) Prior Publication Data

US 2014/0160795 A1    Jun. 12, 2014

(30) Foreign Application Priority Data

Dec. 11, 2012    (CN) .......................... 2012 1 0533719

(51) Int. Cl.
F21V 8/00    (2006.01)

(52) U.S. Cl.
CPC .............. *G02B 6/002* (2013.01); *G02B 6/0068* (2013.01)

(58) Field of Classification Search
CPC ..... G02B 6/002; G02B 6/0073; G02B 6/0068
USPC .................................. 362/612, 613, 621, 628
See application file for complete search history.

(56) References Cited

U.S. PATENT DOCUMENTS

| 8,506,151 | B2* | 8/2013 | Park ............................... 362/613 |
| 8,599,332 | B2* | 12/2013 | Yabe et al. ...................... 349/65 |
| 8,814,415 | B2* | 8/2014 | Kim et al. ...................... 362/612 |
| 2012/0087151 | A1* | 4/2012 | Hamada ........................ 362/615 |

FOREIGN PATENT DOCUMENTS

| CN | 1797106 A | 7/2006 |
| CN | 1940663 A | 4/2007 |
| CN | 102434824 A | 5/2012 |

(Continued)

OTHER PUBLICATIONS

First Office Action for corresponding Chinese Patent Application No. 201210533719.2, 8 pages, (Nov. 5, 2013).

(Continued)

*Primary Examiner* — Peggy Neils
(74) *Attorney, Agent, or Firm* — Blakely, Sokoloff, Taylor & Zafman LLP (57) ABSTRACT

A light guide plate, a backlight module and a display device both comprising the light guide plate are disclosed. The light guide plate comprises a light emitting surface and multiple side surfaces perpendicular to and connected to the light emitting surface, the side surfaces including at least one first side surface and at least one second side surface. The light guide plate further comprises at least one set of folded surfaces perpendicular to and connected to the light emitting surface. Each set of folded surfaces is connected between a pair of first side surface and second side surface which are adjacent with each other. Each set of folded surfaces includes multiple light incident surfaces which are connected one by one. In the light incident surfaces in same set of folded surfaces, any two adjacent light incident surfaces form an acute angle opened toward inside of the light guide plate.

16 Claims, 4 Drawing Sheets

(56) References Cited

FOREIGN PATENT DOCUMENTS

| | | |
|---|---|---|
| CN | 203012174 U | 6/2013 |
| WO | WO 2011/132450 A1 | 10/2011 |

OTHER PUBLICATIONS

Second Office Action for corresponding Chinese Patent Application No. 201210533719.2, 5 pages, (Jul. 1, 2014).

* cited by examiner

LIGHT GUIDE PLATE, BACKLIGHT MODULE AND DISPLAY DEVICE BOTH WITH THE LIGHT GUIDE PLATE

FIELD OF THE INVENTION

The present invention relates to the field of display technology, particularly to a light guide plate, a backlight module and a display device both with the light guide plate.

BACKGROUND OF THE INVENTION

Figure 1:
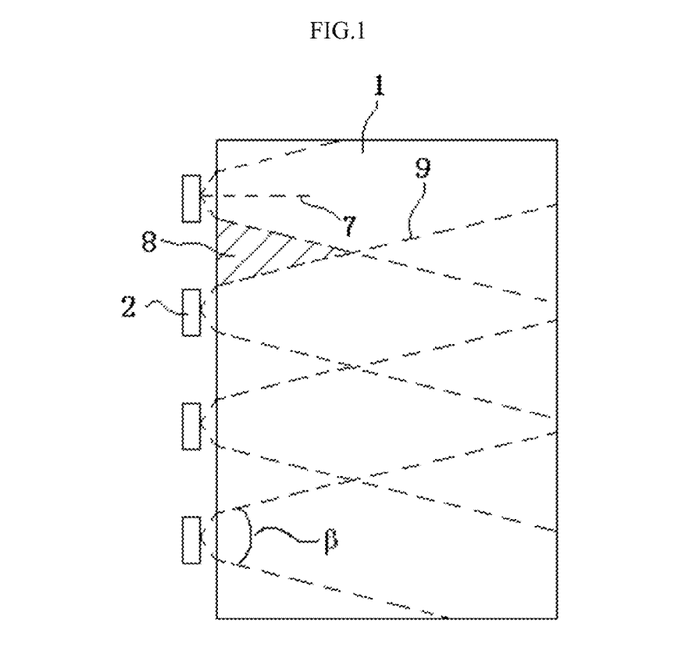
FIG. 1 is a schematic plane view of a structure of a backlight module in the prior art.

The backlight module is an important component of a liquid crystal display (LCD) device. In various types of the backlight modules, edge-lighting backlight module is used widely. As shown in FIG. 1, an edge-lighting backlight module comprises a light guide plate 1 and a plurality of light sources (e.g., LED) 2. The light sources are arranged outside of one side surface of the light guide plate 1 with intervals between the light sources. The optical axis of each of the light sources is perpendicular to said side surface. Light 9 is emitted from the light source 2 into the light guide plate 1, and subjected to series of reflections and refractions, and then emerges from the light emitting surface (upper surface of the light guide plate) so as to be utilized by the LCD device.

Since the light sources are arranged with intervals therebetween, and the refraction angle is smaller than the incident angle when the light 9 is emitted from the light sources into the light guide plate 1 for the reason that the light guide plate 1 is an optically denser medium relative to the air, the intensity between the light 9 emitted into the light guide plate from the positions opposite to the light sources 2 and the positions opposite to the intervals is different. Consequently, dark areas 8 occur between the light sources 2. If the mixed light is insufficient, alternately dark and bright areas may be produced at the edge of the LCD device, which is known as "firefly phenomenon" (also called "hot spot badnes"). Particularly, as the development of the technology, the size of the light guide plate 1 is getting larger and larger, and the number of the light sources 2 is getting less and less, and thereby the firefly phenomenon is more and more apparent.

In order to eliminate the firefly phenomenon, various solutions have been proposed, such as changing the distribution of the scattering points in the light guide plate, adding light mixing microstructures (such as microprisms or recesses) at the light-incident positions for the light sources, and so on. However, these existing solutions will lead to disadvantages of complex structure, difficult manufacture process and high cost of the product. Furthermore, when the number of the light sources is reduced to a certain extent, these solutions cannot eliminate the firefly phenomenon any more.

SUMMARY OF THE INVENTION

In view of the problem that the existing light guide plate will be subject to the firefly phenomenon due to less light sources, the present invention provides a light guide plate capable of eliminating the firefly phenomenon with uniform emergent light even when there are less light sources.

The technical solution adopted to address the problem is a light guide plate comprising: a light emitting surface; and a plurality of side surfaces perpendicular to and connected to the light emitting surface, the plurality of side surfaces including at least one first side surface and at least one second side surface; at least one set of folded surfaces perpendicular to and connected to the light emitting surface, in which each set of folded surfaces is connected between a different pair formed of the first side surface and the second side surface which are adjacent with each other, and each set of folded surfaces includes a plurality of light incident surfaces which are connected one by one, wherein, in the plurality of light incident surfaces in the same set of folded surfaces, any two adjacent light incident surfaces form an obtuse angle opened toward inside of the light guide plate.

Preferably, the plurality of side surfaces include two first side surfaces and two second side surfaces; and the two first side surfaces are parallel to each other, the two second side surfaces are parallel to each other, and the first side surfaces are perpendicular to the second side surfaces. More preferably, the plurality of side surfaces consist of the two first side surfaces and the two second side surfaces.

The right angle in a conventional light guide plate is replaced by an obtuse angle in the present invention, and light sources are disposed at the two sides of the obtuse angle respectively. In other words, compared to the conventional light guide plate, both of the position and angle of the light incident surface are essentially changed in the present invention. It has been discovered by researching that a light guide plate with such arrangement may increase, greatly the coupling efficiency between the light source and the light guide plate, and thus is capable of eliminating the firefly phenomenon with uniform intensity of the emergent light even when there are less light sources. In addition, such light guide plate has advantages of simple structure, convenient manufacturing process and low cost.

More preferably, a distance between the two second side surfaces is L1, a distance between the two first side surfaces is L2, and L1≤L2; and any one of the at least one set of folded surfaces has an orthogonal projection with a length smaller than or equal to L1/50 on a plane to which the first side surface connected to the one set of folded surfaces belongs, and has an orthogonal projection with a length smaller than or equal to L2/50 on a plane to which the second side surface connected to the one set of folded surfaces belongs.

Preferably, the plurality of light incident surfaces include a first light incident surface and a second light indecent surface.

More preferably, an acute angle between the first light incident surface in the one set of folded surfaces and the plane to which the first side surface connected to the first light incident surface belongs is $\alpha 1$, an acute angle between the second light incident surface in the one set of folded surfaces and the plane to which the second side surface connected to the second light incident surface belongs is $\alpha 2$, and $\alpha 1$ and $\alpha 2$ satisfying conditions as fellows: $\alpha 1 \leq R$, $\alpha 2 \leq R$, $1 \leq \tan(R+\alpha 1) \tan(R+\alpha 2)$: where R is the maximal refraction angle of light emitted from light source for the guide plate when the light is incident into the light guide plate.

The expression "an acute angle between the first light incident surface and the plane to which the first side surface belongs" means an angle larger than 0° and smaller than 90 between the first light incident surface and the plane. The expression "the maximal refraction angle of light emitted from light source for the guide plate when the light is incident into the light guide plate" means a refraction angle obtained by a light being emitted with maximum light emergent angle from the light source to the light guide plate when the light source matching with the light guide plate is disposed outside of a side surface of the light guide plate (the optical axis of the light source is perpendicular to the side surface for which the light source is provided).

Preferably, $35° \leq R \leq 42°$.

More preferably, in the one set of folded surfaces, al $\alpha 2$.

Preferably, the light guide plate comprises two to four sets of folded surfaces.

More preferably, the light guide plate comprises two sets of folded surfaces, which are connected between different first side surface and second side surface, respectively.

In view of the problem that the existing light guide plate will be subject to the firefly phenomenon due to less light sources, the present invention further provides a backlight module capable of eliminating the firefly phenomenon with uniform emergent light even when there are less light sources.

The technical solution adopted to address the problem is a backlight module comprising the light guide plate as stated above.

Since the backlight module of the present invention comprises the above mentioned light guide plate, it has uniform lightness and is not subject to the firefly phenomenon. Further, since the firefly phenomenon will not occur even if there is less light sources, the back light module of the present invention needs less light sources and thus the cost and energy consumption may be reduced.

Preferably, at least one light source is disposed outside of each of the two light incident surfaces in each of the at least one set of folded surfaces of the light guide plate, the optical axis of the light source being perpendicular to the light incident surface for which the light source is disposed.

Preferably, at least two light sources are disposed outside of at least one of the two light incident surfaces in each of the at least one set of folded surfaces of the light guide plate, the optical axis of the light source being perpendicular to the light incident surface for which the light source is disposed.

Preferably, a light source is disposed outside of at least one of the plurality of side surfaces of the light guide plate (such as the first side surface and/or the second side surface), the optical axis of the light source being perpendicular to the light incident surface for which the light source is disposed.

In view of the problem that the existing light guide plate will be subject to the firefly phenomenon due to less light sources, the present invention further provides a display device capable of eliminating the firefly phenomenon with uniform emergent light even when there are less light sources.

The technical solution adopted to address the problem is a display device comprising the backlight module as stated above.

Since the display device of the present invention comprises the above mentioned backlight module, it has uniform lightness and is not subject to the firefly phenomenon. Further, the display device of the present invention needs less light sources and thus the cost and energy consumption may be reduced.

The present invention is particularly suitable for a LCD device having a large size and less light sources, such as a liquid crystal display of a computer, a liquid crystal television and the like.

NUMERALS OF THE COMPONENTS IN THE FIGURES

1: light guide plate 11: first side surface 12: second side surface 131: first light incident surface 132: second light incident surface 2: light source 7: optical axis 8: dark area 81: dark area 82: dark area 83: dark area 9: light 911: light 912: light 921: light 922: light

DETAILED DESCRIPTION OF THE EMBODIMENTS

The present invention will be explained in detail below by specific embodiments in connection with the drawings so that technical solutions of the present invention can be best understood by the skilled in the art.

The First Embodiment

The present embodiment provides a light guide plate comprising a light emitting surface and a plurality of side surfaces perpendicular to and connected to the light emitting surface.

The plurality of side surfaces include at least one first side surface and at least one second side surface. The light guide plate further comprises at least one set of folded surfaces perpendicular to and connected to the light emitting surface, in which each set of folded surfaces is connected between a different pair formed of a first side surface and a second side surface which are adjacent with each other, and each set of folded surfaces includes a plurality of light incident surfaces which are connected one by one; wherein, in the plurality of light incident surfaces in same set of folded surfaces, any two adjacent light incident surfaces form an obtuse angle opened toward inside of the light guide plate.

Preferably, the plurality side surfaces include two first side surfaces and two second side surfaces; and the two first side surfaces are parallel to each other, the two second side surfaces are parallel to each other, and the first side surfaces are perpendicular to the second side surfaces.

The right angle (i.e., the angle at the Junction of the first side surface and the second side surface) of the light guide plate in the conventional light guide plate is replaced by an obtuse angle in the present invention, and light sources are disposed at the two sides of the obtuse angle respectively (the light sources may be disposed outside of the two sides of the obtuse angle, and the optical axes of the light sources may be perpendicular to the respective sides for which the light sources are disposed. In other words, compared to the conventional light guide plate, both of the position and angle of the light incident surface are essentially changed in the present invention. It has been discovered by researching that a light guide plate with such arrangement may increase greatly the coupling efficiency between the light source and the light guide plate, and thus is capable of eliminating the firefly phenomenon with uniform intensity of the emergent light even when there are less light sources. In addition, such light guide plate has advantages of simple structure, convenient manufacturing process and low cost.

In the light guide plate of the present embodiment, it is preferable that two first side surfaces and two second side surfaces are provided, the two first side surfaces are parallel to each other, the two second side surfaces are parallel to each other, and the first side surfaces are perpendicular to the second side surfaces (i.e., the shape of the entire light emitting surface is similar to a rectangle). However, it should be understand that modification on the number and positions of and the angle between the first and the second side surfaces and the like, or addition of other side surfaces (i.e., the light emitting surface has a shape of other polygon) may be possible.

The Second Embodiment

The present embodiment provides a light guide plate 1 comprising a light emitting surface and side surfaces perpendicular to and connected to the light emitting surface, as shown in FIGS. 2 to 6.

Figure 2:
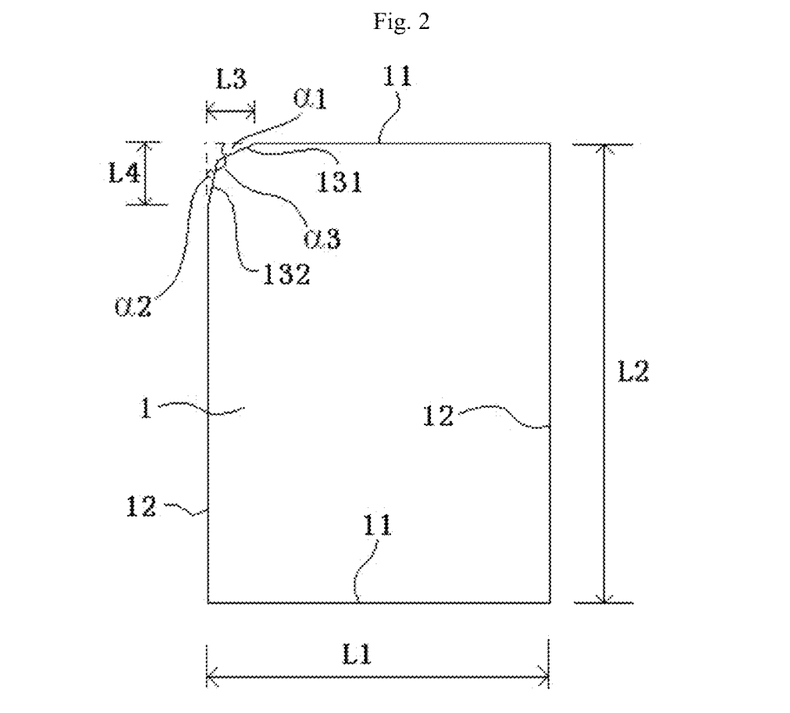
FIG. 2 is a schematic plane view of a structure of a backlight module of the second embodiment of the present invention.
Figure 3:
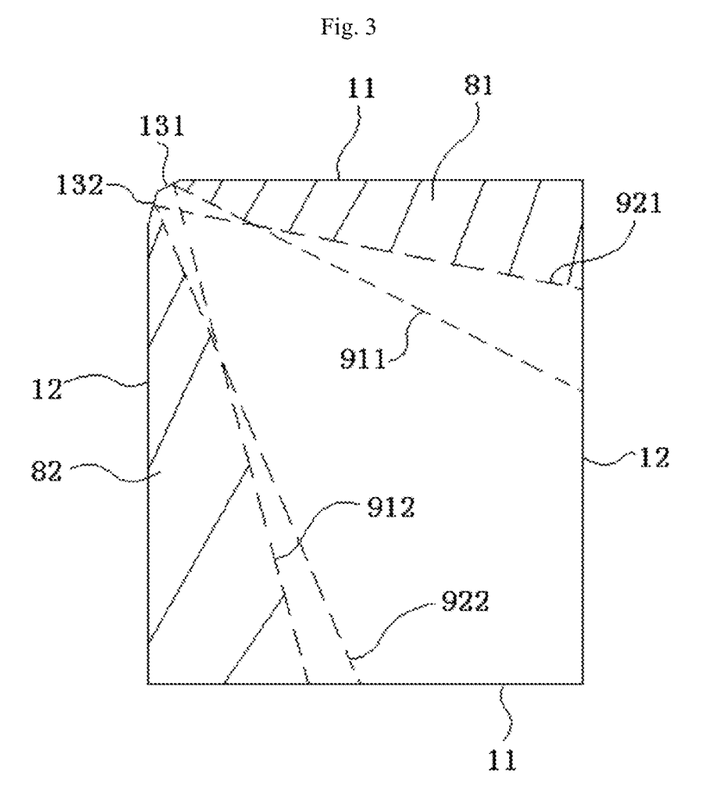
FIG. 3 is a schematic diagram for explaining the principle that a type of dark area is produced in a light guide plate of the second embodiment of the present invention.

Preferably, as shown in FIG. 2, the light guide plate 1 comprises:

two first side surfaces 11 parallel with each other, with a distance L2 between them (i.e., the length of the light guide plate 1 is L2);

two second side surfaces 12 parallel with each other, with a distance L1 between them (i.e., the width of the light guide plate 1 is L1, and L1≤L2), the second side surfaces 12 being perpendicular to the first side surfaces 11, i.e., the shape of the entire light emitting surface of the light guide plate 1 being similar to a rectangle; and at least one set of folded surfaces, each of which is connected between a pair formed of the first side surface 11 and the second side surface 12 which are adjacent with each other. In other words, in the present embodiment, there are two pairs formed of the first side surface 11 and the second side surface 12 which are adjacent with each other, between at least one pair formed of the adjacent first side surface 11 and second side surface 12, there is one set of folded surfaces connected. Preferably, each set of folded surfaces consists of a first light incident surface 131 and a second light incident surface 132 connected with each other, wherein the first light incident surface 131 is connected to the first side surface 11, and an acute angle between the first light incident surface 131 and the first side surface 11 is α1; the second light incident surface 132 is connected to the second side surface 12, and an acute angle between the second light incident surface 132 and the second side surface 12 is α2; the first light incident surface 131 and the second light incident surface 132 form an obtuse angle α3 opened toward inside of the light guide plate 1.

That is, each set of folded surfaces may be regarded as a structure obtained by bending portions of the first and the second side surfaces 11 and 12 at a right angle of the light guide plate 1 toward inside of the light guide plate 1. As a result, the original right angle of the light guide plate 1 becomes an obtuse angle after such bending. That is to say, the two sides which form the obtuse angle are the first light incident surface 131 and the second light incident surface 132.

Obviously, since the shape of the entire light emitting surface of the light guide plate 1 in the present embodiment is similar to a rectangle, it is certainly that the first light incident surface 131 and the second light incident surface 132 are bent toward inside of the light guide plate 1 (in other words, the shape of the light emitting surface must be a "convex polygon") as long as the angle α3 is an obtuse angle, according to geometric principle. This is because, if any one of the light incident surfaces 131, 132 is bent toward outside of the light guide plate 1, the angle α3 must be an acute angle (less than 90°).

It is assumed that an orthogonal projection of each set of folded surfaces on a plane to which the first side surface 11 belongs has a length of L3, and an orthogonal projection of each set of folded surfaces on a plane to which the second side surface 12 belongs has a length of L4. Preferably. L3≤L1/50, L4≤L2/50.

That is to say, the size of each set of folded surfaces should be very small compared to the entire size of the light guide plate 1 (in other words, the lengths of the first and the second light incident surfaces 131, 132 should be very small). Since the folded surfaces will change the shape of the light emitting surface, the shape of the light emitting surface will not be similar TO a rectangle any longer if the size of the folded surfaces is too large, which will affect the applicable range of the light emitting surface.

Further preferably, the angles for each set of folded surfaces should satisfy the following three conditions simultaneously:

$$\alpha1 \le R,$$

$$\alpha2 \le R,$$

$$1 \le \tan(R+\alpha1) \times \tan(R+\alpha2),$$

where tan is the tangent function, R is the maximal refraction angle (i.e., the maximum value of the refraction angle) of light emitted from light source 2 for the guide plate 1 when the light is incident into the light guide plate. Obviously, the light emitted by the light source 2 will be refracted when it enters into the light guide plate 1, and its refraction angle r satisfies the following equation:

$$n1 \times \sin r = n2 \times \sin i,$$

where sin is the sine function, n1 is the refractivity of the light guide plate 1, n2 is the refractivity of the air, and i is the incident angle when the light of the light source 2 enters into the light guide plate 1. As for a light guide plate formed by PMMA (Polymethylmethacrylate), the refractivity may be n1=149. Since n2-1, and the light emergent angle of the light source 2 is generally ranged from 120° to 180°, the maximum value of the incident angle is generally ranged from 60° to 90°. Thus, the resultant value of R is generally ranged from 35° to 42°. Of course, a specific value of R depends on the type of the light source 2, the material of the light guide plate and so on. The above mentioned numeral value of R should not be deemed as a limitation to R.

The values of α1 and α2 are chosen according to the above equations, so that the light from the light guide plate will be more uniform.

As mentioned above, R is generally no more than 42°. That is, the angle of illumination (see (3 shown in FIG. 1) of the light beam from the light source 2 when entering into the light guide plate will typically be no more than 84°, and below 90°. For this reason, it is still possible that a dark area occurs in the light guide plate 1 of the present embodiment.

As shown in FIG. 1 *f* the values of α1 and α2 are not proper, the light emitted from the light sources 2 disposed outside of the first and second light incident surfaces 131, 132 can arrive to neither the first side surface 11 connected with the first light incident surface 131 nor the second side surface 12 connected with the second light incident surface 132. Thus, the dark areas 81, 82 will occur at the regions near the first side surface 11 and the second side surface 12.

Figure 4:
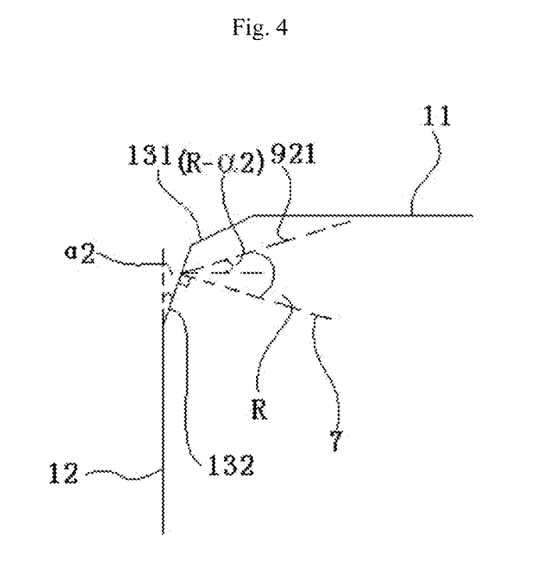
FIG. 4 is a schematic diagram of a partially enlarged structure of a light guide plate of the second embodiment of the present invention when dark areas are to be eliminated.

As shown in FIG. 4, in order to eliminate the dark area 81 located near the first side surface 11, it is necessary for the light 921 emitted from the light sources 2 disposed outside of the second light incident surface 132 to cover the first side surface 11 as much as possible. In other words, the light 921, which is the nearest light to the first side surface 11 and the light with maximum refraction angle R among the light emitted from the light sources 2 disposed outside of the second light incident surface 132, is able to fall on the first side surface 11. That is, the light 921 should incline upward in the FIG. 4. As shown in FIG. 4, in order to satisfy such requirements, it is necessary that $0 \leq R \ldots \alpha2$, i.e., $\alpha2 \leq R$. Also, in order to eliminate the dark area 82 located near the second side surface 12, $\alpha1 \leq R$.

Of course, in an actual light guide plate 1, very small dark areas may still occur near the folded surfaces inevitably due to the presence of the folded surfaces. However, since the size of the folded surfaces is so small relative to the size of the entire light guide plate 1 that dark areas may be ignored.

Figure 5:
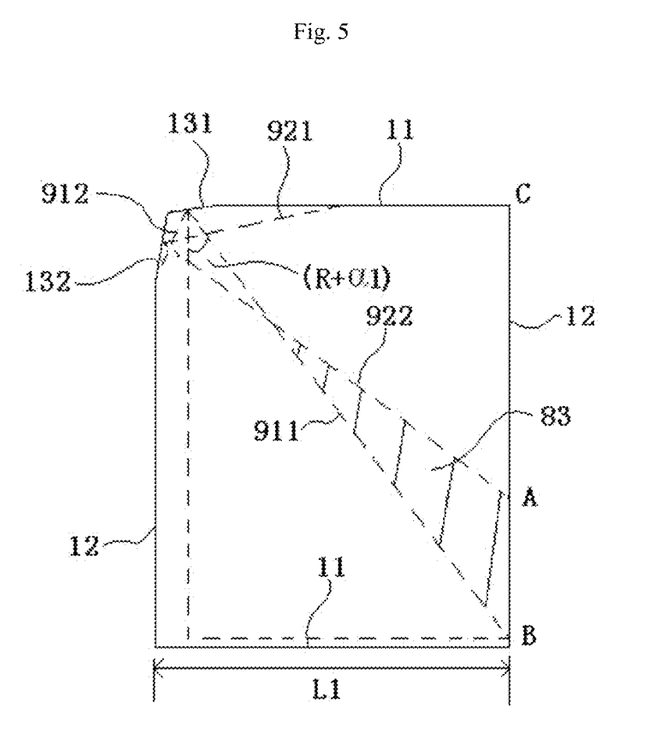
FIG. 5 is a schematic diagram for explaining the principle that another type of the dark area is produced in a light guide plate of the second embodiment of the present invention.

As shown in FIG. 5, in the case that the values of $\alpha1$ and $\alpha2$ are not proper, a dark area 83 may occur between the light 911 which is emitted by the light sources 2 disposed outside of the first light incident surface 131 and the light 922 which is emitted by the light sources 2 disposed outside of the second light incident surface 132. In order to eliminate the dark area 83, it should be ensured that the position of point B coincides with or is on the upper side of the position of point A in FIG. 5. That is, $CB \leq CA$, where CB represents the length between point C and point B, and CA represents the length between point C and point A.

As shown in FIG. 5, in the case that the size of the folded surfaces can be ignored, CB should satisfy the equation: $\tan(R+\alpha1)=L1/CB$, from which it can be derived that $CB=L1/\tan(R+\alpha1)$. Also, CA should satisfy the equation: $\tan(R+\alpha2)=CA/L1$, from which it can be derived that $CA=L1 \times \tan(R+\alpha2)$.

From this it can be concluded that, if $CB \leq CA$, $L1/\tan(R+\alpha1) \leq L1 \times \tan(R+\alpha2)$. That is, $1 \leq \tan(R+\alpha1) \times \tan(R+\alpha2)$.

Thus, it can be seen that if $\alpha1$ and $\alpha2$ satisfy the foregoing three conditions, the dark areas 81, 82 and 83 will be eliminated and the emergent light will be more uniform.

More preferably, $\alpha2=\alpha1$.

That is to say, preferably a1 is equal to $\alpha2$, which results in better uniformity of the light from the light guide plate 1, a simpler structure of the light guide plate and an easier design.

Preferably, there are two to four sets of folded surfaces in the light guide plate 1. That is, at least two corners of the light guide plate 1 may be arranged as the structure of the above folded surfaces so that more light sources 2 may be disposed.

Figure 6:
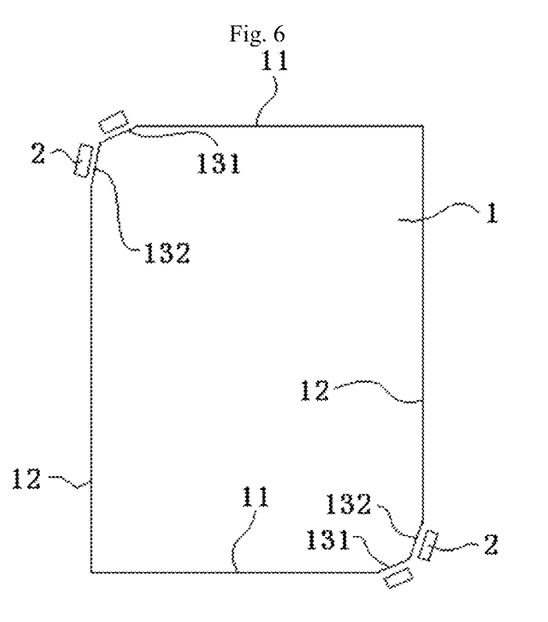
FIG. 6 is a schematic plane view of the structure of a backlight module of the third embodiment of the present invention.

More preferably, as shown in FIG. 6, in the case that there are two sets of folded surfaces arranged in the light guide plate 1, the two sets of folded surfaces are connected between two pairs formed of first side surface 11 and second side surface 12 respectively, in which the first side surface 11 and the second side surface 12 in one of the two pairs are different from the first side surface 11 and the second side surface 12 in the other pair respectively. In other words, the two sets of folded surfaces are preferably arranged at two corners on a diagonal of the light guide plate 1 respectively. According to simulating calculation, such arrangement may ensure better uniformity of the emergent light effectively.

Of course, numerous variations may be made to the light guide plate of the present embodiment. For example, light mixing microsuuctures may be disposed for making the incident light uniform at the positions on which the light sources is to be disposed.

The Third Embodiment

As shown in FIG. 6, the present embodiment provides a backlight module comprising the light guide plate 1 as mentioned above.

Since the backlight module of the present embodiment utilizes the above mentioned light guide plate 1, it has uniform lightness and is not subject to the firefly phenomenon, even when there are less light sources 2. Thus, the backlight module needs less light sources and the cost and energy consumption may be reduced.

Preferably, at least one light source 2 is disposed outside of each of the two light incident surfaces 131, 132 in each of the at least one set of folded surfaces of the light guide plate 1, and the light axes 7 of the light sources 2 are perpendicular to the light incident surfaces 131, 132 for which the respective light sources are disposed.

Figure 7:
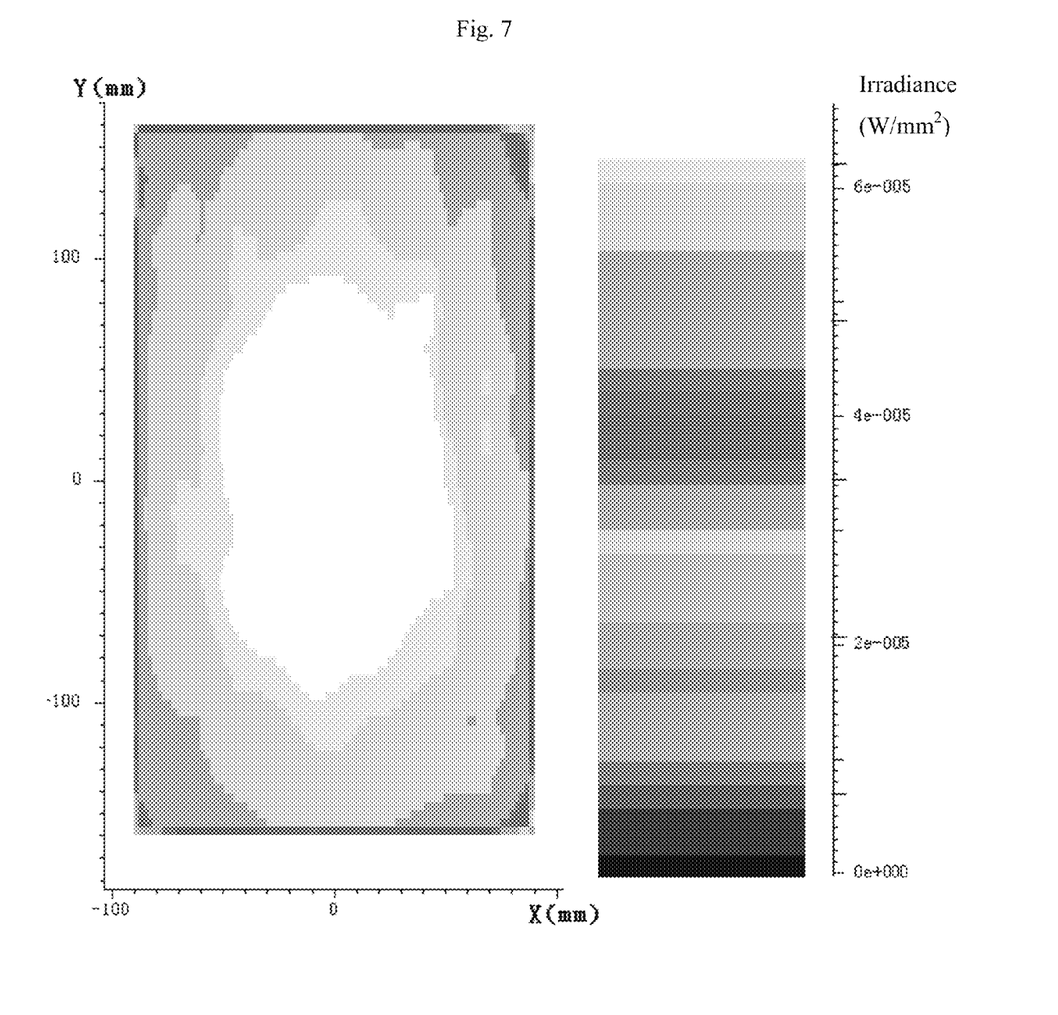
FIG. 7 is a schematic simulating diagram of the luminance of emergent light of the third embodiment of the present invention.

FIG. 7 is a schematic simulating diagram of the luminance of emergent light of the backlight module as shown in FIG. 6. From FIG. 7 it can be seen that most of the region has high and uniform luminance and there is no firefly phenomenon.

Preferably, at least two light sources 2 may be disposed outside of each of the light incident surfaces 131, 132 of the light guide plate 1 (now shown).

That is, in the backlight module, preferably a plurality of light sources 2 are disposed outside of each of the light incident surfaces 131, 132 in order to improve the amount of the incident light.

Preferably, light sources 2 are also disposed outside of the first side surface 11 and/or the second side surface 12 of the light guide plate 1.

That is, although the light incident surfaces 131, 132 different from those in traditional arts are added in the backlight module of the present embodiment, other side surfaces (the first side surfaces 11 and the second side surfaces 12) of the light guide plate may be also served as traditional light incident surfaces disposed with light sources 2, so that the uniformity of the emergent light may be further improved.

Of course, numerous variations may be made to the backlight module of the present embodiment. For example, the light source 2 may be a separate light source 2, or light sources 2 connected as a line. Alternatively, other types of light sources such as cold cathode fluorescence lamp (CCFL) and the like may be used in the backlight module.

The Fourth Embodiment

The present embodiment provides a display device comprising the above backlight module.

Since the display device of the present invention comprises the above backlight module, it has uniform lightness and is not subject to the firefly phenomenon. Further, the display device of the present invention needs less light sources and thus the cost and energy consumption may be reduced.

Of course, numerous variations may be made to the display device of the present embodiment. For example, the display device may comprise other components such as a display panel, frames, a power supply, and so on.

It should be understood that, the above embodiments are only examples for explaining the principle of the present invention. The present invention should not be limited thereto. It is obvious for those skilled in the art that various modifications and improvements may be made without departing from the spirit and essence of the present invention, and should be deemed as falling into the scope of the invention.

What is claimed is:

1. A light guide plate, comprising:
   a light emitting surface; and
   a plurality of side surfaces perpendicular to and connected to the light emitting surface, the plurality of side surfaces including at least one first side surface and at least one second side surface; and
   wherein the light guide plate further comprises:
   at least one set of folded surfaces perpendicular to and connected to the light emitting surface, in which each set of folded surfaces is connected between a different pair formed of the first side surface and the second side surface which are adjacent with each other, and each set of folded surfaces includes a plurality of light incident surfaces which are connected one by one, wherein,
   in the plurality of light incident surfaces in the same set of folded surfaces, any two adjacent light incident surfaces form an obtuse angle opened toward inside of the light guide plate,
   each set of folded surfaces includes a first light incident surface and a second light incident surface, wherein the first light incident surface is adjacent to and connected to the first side surface, and the second light incident surface is adjacent to and connected to the second side surface, and
   an acute angle between the first light incident surface and the plane to which the first side surface connected to the first light incident surface belongs is a1, an acute angle between the second light incident surface and the plane to which the second side surface connected to the second light incident surface belongs is α2, and α1 and α2 satisfy conditions as follows:

$\alpha 1 \leq R,$ $\alpha 2 \leq R,$ $1 \leq \tan(R+\alpha 1) \times \tan(R+\alpha 2);$ where R is the maximal refraction angle of light emitted from the light source for the light guide plate when the light is incident into the light guide plate.

2. The light guide plate as claimed in claim 1, wherein the plurality of side surfaces include two first side surfaces and two second side surfaces; and
   the two first side surfaces are parallel to each other, the two second side surfaces are parallel to each other, and the first side surfaces are perpendicular to the second side surfaces.

3. The light guide plate as claimed in claim 2, wherein
   a distance between the two second side surfaces is L1, a distance between the two first side surfaces is L2, and L1≤L2; and
   any one of the at least one set of folded surfaces has an orthogonal projection with a length smaller than or equal to L1/50 on a plane to which the first side surface connected to the one set of folded surfaces belongs, and has an orthogonal projection with a length smaller than or equal to L2/50 on a plane to which the second side surface connected to the one set of folded surfaces belongs.

4. The light guide plate as claimed in claim 1, wherein 35°≤R≤42°.

5. The light guide plate as claimed in claim 1, wherein in the one set of folded surfaces, α1=α2.

6. The light guide plate as claimed in claim 2, wherein the light guide plate comprises two to four sets of folded surfaces.

7. The light guide plate as claimed in claim 6, wherein the light guide plate comprises two sets of folded surfaces, which are connected between different first side surface and second side surface, respectively.

8. A backlight module comprising a light guide plate comprising:
   a light emitting surface; and
   a plurality of side surfaces perpendicular to and connected to the light emitting surface, the plurality of side surfaces including at least one first side surface and at least one second side surface; and
   wherein the light guide plate further comprises:
   at least one set of folded surfaces perpendicular to and connected to the light emitting surface, in which each set of folded surfaces is connected between a different pair formed of the first side surface and the second side surface which are adjacent with each other, and each set of folded surfaces includes a plurality of light incident surfaces which are connected one by one, wherein,
   in the plurality of light incident surfaces in the same set of folded surfaces, any two adjacent light incident surfaces form an obtuse angle opened toward inside of the light guide plate,
   each set of folded surfaces includes a first light incident surface and a second light incident surface, wherein the first light incident surface is adjacent to and connected to the first side surface, and the second light incident surface is adjacent to and connected to the second side surface, and
   an acute angle between the first light incident surface and the plane to which the first side surface connected to the first light incident surface belongs is a1, an acute angle between the second light incident surface and the plane to which the second side surface connected to the second light incident surface belongs is α2, and α1 and α2 satisfy conditions as follows:

$\alpha 1 \leq R,$ $\alpha 2 \leq R,$ $1 \leq \tan(R+\alpha 1) \times \tan(R+\alpha 2);$ where R is the maximal refraction angle of light emitted from the light source for the light guide plate when the light is incident into the light guide plate.

9. The backlight module as claimed in claim 8, wherein plurality of side surfaces include two first side surfaces and two second side surfaces; and
   the two first side surfaces are parallel to each other, the two second side surfaces are parallel to each other, and the first side surfaces are perpendicular to the second side surfaces.

10. The backlight module as claimed in claim 9, wherein a distance between the two second side surfaces is L1, a distance between the two first side surfaces is L2, and L1≤L2; and
    any one of the at least one set of folded surfaces has an orthogonal projection with a length smaller than or equal to L1/50 on a plane to which the first side surface connected to the one set of folded surfaces belongs, and has an orthogonal projection with a length smaller than or equal to L2/50 on a plane to which the second side surface connected to the one set of folded surfaces belongs.

11. The backlight module as claimed in claim 9, wherein the light guide plate comprises two to four sets of folded surfaces.

12. The backlight module as claimed in claim 11, wherein the light guide plate comprises two sets of folded surfaces, which are connected between different first side surface and second side surface, respectively.

13. The backlight module as claimed in claim 8, wherein at least one light source is disposed outside of each of the two light incident surfaces in each of the at least one set of folded surfaces of the light guide plate, the optical axis of the light source being perpendicular to the light incident surface for which the light source is disposed.

14. The backlight module as claimed in claim 13, wherein at least two light sources are disposed outside of at least one of the two light incident surfaces in each of the at least one set of folded surfaces of the light guide plate, the optical axis of the light source being perpendicular to the light incident surface for which the light source is disposed.

15. The backlight module as claimed in claim 13, wherein a light source is disposed outside of at least one of the plurality side surfaces of the light guide plate, the optical axis of the light source being perpendicular to the light incident surface for which the light source is disposed.

16. A display device comprising a backlight module comprising a light guide plate comprising:
a light emitting surface; and
a plurality of side surfaces perpendicular to and connected to the light emitting surface, the plurality of side surfaces including at least one first side surface and at least one second side surface; and
wherein the light guide plate further comprises:
at least one set of folded surfaces perpendicular to and connected to the light emitting surface, in which each set of folded surfaces is connected between a different pair formed of the first side surface and the second side surface which are adjacent with each other, and each set of folded surfaces includes a plurality of light incident surfaces which are connected one by one, wherein,
in the plurality of light incident surfaces in the same set of folded surfaces, any two adjacent light incident surfaces form an obtuse angle opened toward inside of the light guide plate,
each set of folded surfaces includes a first light incident surface and a second light incident surface, wherein the first light incident surface is adjacent to and connected to the first side surface, and the second light incident surface is adjacent to and connected to the second side surface, and
an acute angle between the first light incident surface and the plane to which the first side surface connected to the first light incident surface belongs is α1, an acute angle between the second light incident surface and the plane to which the second side surface connected to the second light incident surface belongs is α2, and α1 and α2 satisfy conditions as follows:

$$\alpha 1 \leq R,$$

$$\alpha 2 \leq R,$$

$$1 \leq \tan(R+\alpha 1) \times \tan(R+\alpha 2);$$

where R is the maximal refraction angle of light emitted from the light source for the light guide plate when the light is incident into the light guide plate.

* * * * *